United States Patent
Shetty et al.

(10) Patent No.: US 11,012,287 B1
(45) Date of Patent: May 18, 2021

(54) SYSTEM MANAGEMENT DOMAIN AND NETWORK MANAGEMENT DOMAIN SYNCHRONIZATION SYSTEM

(71) Applicant: Dell Products L.P., Round Rock, TX (US)

(72) Inventors: Sudhir Vittal Shetty, Cedar Park, TX (US); Charles Chul Hyon Park, San Jose, CA (US); Zoheb Khan, Austin, TX (US); Balaji Rajagopalan, Sunnyvale, CA (US); Pawan Kumar Singal, Milpitas, CA (US); Joseph LaSalle White, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 16/731,946

(22) Filed: Dec. 31, 2019

(51) Int. Cl.
*G06F 15/173* (2006.01)
*H04L 12/24* (2006.01)
*H04L 12/18* (2006.01)
*H04L 29/12* (2006.01)
*H04L 12/46* (2006.01)

(52) U.S. Cl.
CPC .......... *H04L 41/042* (2013.01); *H04L 12/185* (2013.01); *H04L 61/1511* (2013.01); *H04L 61/2069* (2013.01); *H04L 12/4641* (2013.01)

(58) Field of Classification Search
CPC . H04L 41/042; H04L 61/2069; H04L 12/185; H04L 61/1511; H04L 12/4641

USPC ................. 709/220, 221, 222, 223
See application file for complete search history.

(56) References Cited

U.S. PATENT DOCUMENTS

| | | | |
|---|---|---|---|
| 8,583,753 B1* | 11/2013 | Bhagwatula | H04L 67/16 709/208 |
| 2005/0060413 A1* | 3/2005 | Oyadomari | H04L 43/18 709/227 |
| 2005/0144434 A1* | 6/2005 | Taylor | G06F 15/177 713/2 |
| 2005/0188173 A1* | 8/2005 | Hasbun | G06F 12/1466 711/203 |
| 2013/0151704 A1* | 6/2013 | Chandolu | G06F 21/6218 709/225 |

\* cited by examiner

*Primary Examiner* — Johnny B Aguiar
(74) *Attorney, Agent, or Firm* — Haynes and Boone, LLP

(57) ABSTRACT

A system/network management domain synchronization system includes a first computing system that belongs to a first MCM group and that includes a first computing system I/O module that belongs to a first network management domain, and a second computing system that is coupled to the first computing system. The second computing system includes a second computing system management module that joins the first MCM group and, in response, broadcasts a first announcement that includes a first MCM group identifier for the first MCM group. The second computing system also includes a second computing system I/O module that receives the first announcement, determines that the second computing system management module is included in the second computing system with the second computing system I/O module and, n response, joins the first network management domain.

20 Claims, 16 Drawing Sheets

SYSTEM MANAGEMENT DOMAIN AND NETWORK MANAGEMENT DOMAIN SYNCHRONIZATION SYSTEM

BACKGROUND

The present disclosure relates generally to information handling systems, and more particularly to synchronizing system management domains and network management domains provided for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided by a "modular" computing system in a chassis, and groups of such modular computing systems may be utilized to form a logical chassis management domain that is often referred to as a Multi-Chassis Management (MCM) group. Within such MCM groups, a system management domain may be created to manage the modular computing systems in the MCM group, with a "lead" modular computing system operating to manage the "member" modular computing systems via the system management domain. Furthermore, each modular computing system may include one or more Input/Output (I/O) modules that are configured to provide a network management domain for that modular computing system. However, prior to joining an MCM group, any modular computing system will include I/O modules that provide a particular networking management domain for that modular computing system (i.e., that is different than the network management domain provided for other modular computing systems by their respective I/O modules.) As such, the formation of an MCM group may result in a single management domain for the modular computing systems in that MCM group, but different network management domains provided for each modular computing system in that MCM group (by their respective I/O modules), which results in different management access points for the networking fabric within the system management domain.

Accordingly, it would be desirable to provide a system management domain and network management domain synchronization system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Input/Output (I/O) engine that is configured to: receive a first announcement that was broadcast by a management module and that includes a first MCM group identifier for a first MCM group; determine that the management module is included in a chassis with the I/O engine; and join, in response to receiving the first MCM group identifier for the first MCM group in the first announcement broadcast by the management module that is included the chassis with the I/O engine, a first network management domain that is provided by at least one I/O module in a first computing system that is included in the first MCM group.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
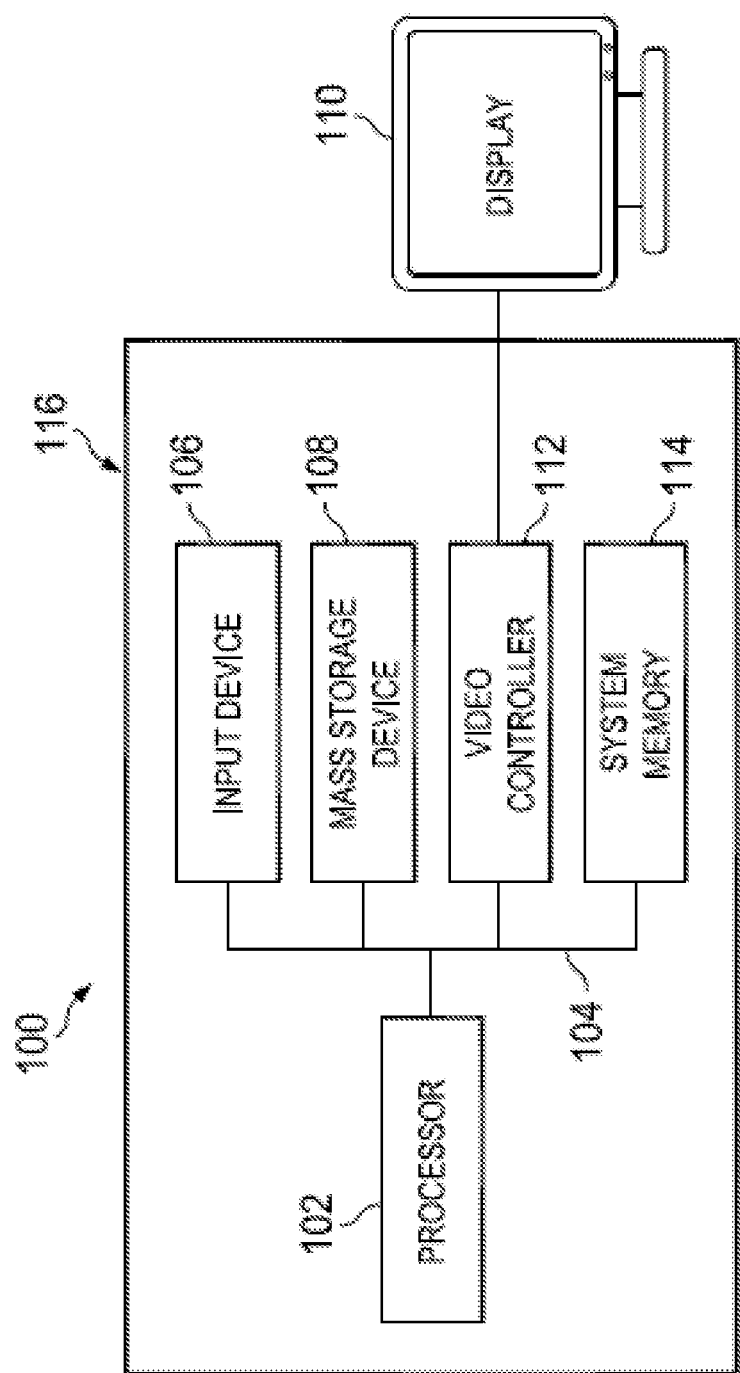
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
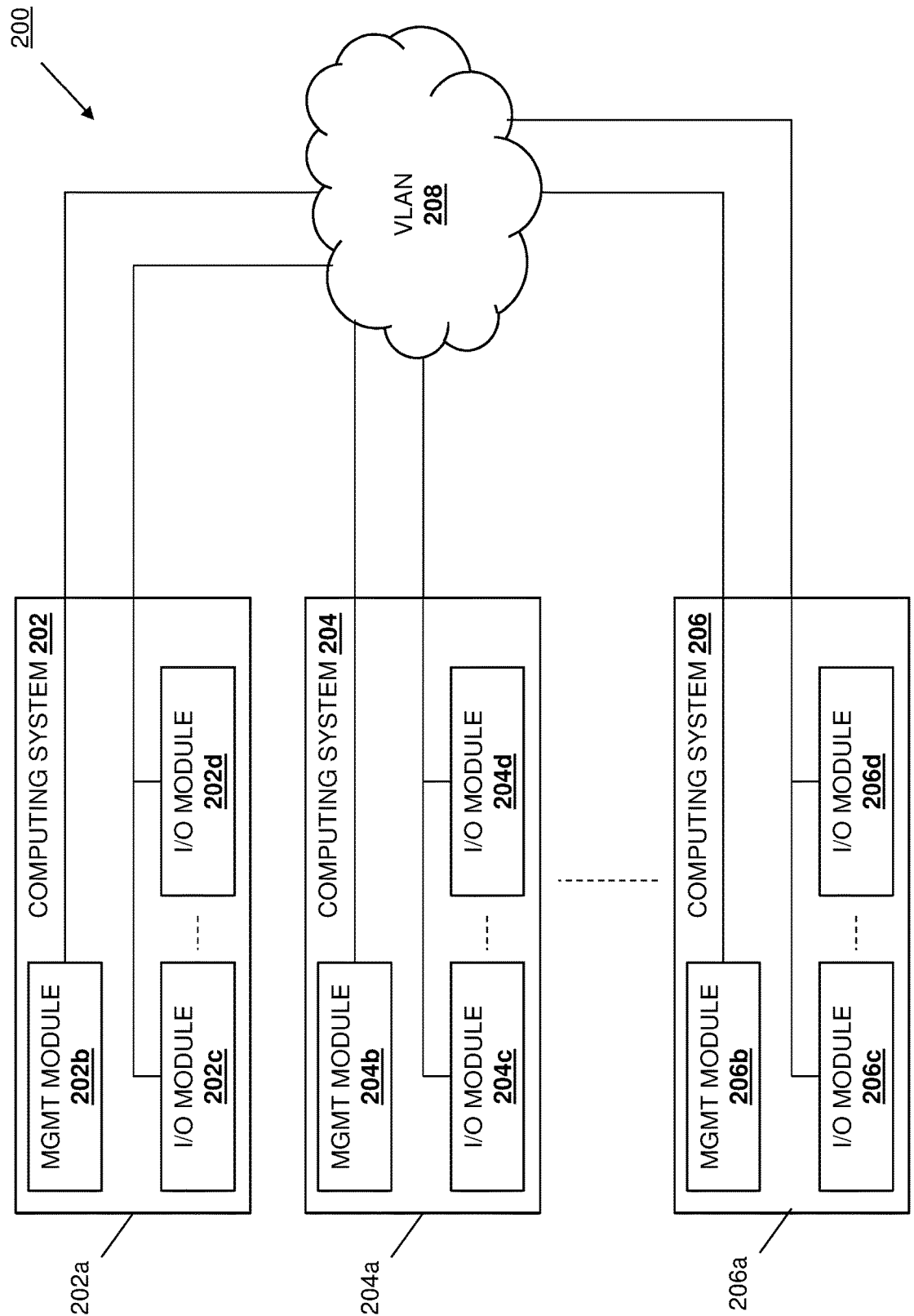
FIG. 2 is a schematic view illustrating an embodiment of a system management domain and network management domain synchronization system.

Referring now to FIG. 2, an embodiment of a system management domain and network management domain synchronization system 200 is illustrated. In the illustrated embodiment, the system management domain and network management domain synchronization system 200 incudes a plurality of computing systems 202, 204, and up to 206. In an embodiment, any or all of the computing systems 202-206 may be provided by the IHS 100 discussed above with reference to FIG. 1, and/or may include some or all of the components of the IHS 100. In the specific examples discussed below, each of the computing systems are provided by a modular computing system in a respective chassis, with the module computing systems configurable in a manner that allows groups of the modular computing systems to be utilized to form a logical chassis management domain that is often referred to as a Multi-Chassis Management (MCM) group. However, while illustrated and discussed as modular computing systems, one of skill in the art in possession of the present disclosure will recognize that computing systems provided in the system management domain and network management domain synchronization system 200 may include any devices and/or systems that may be configured to operate similarly as the computing systems discussed below. Each chassis provided for a computing system may include multiple servers, each server with its own processing, memory, etc. chassis may include eight servers and four I/O modules.

In the illustrated embodiment, each of the computing systems 202-206 includes a management module and a plurality of Input/Output (I/O) modules that are each coupled to a Virtual Local Area Network (VLAN) 208. In the specific examples discussed below, the VLAN 208 is provided by a private, inter-chassis VLAN, although one of skill in the art in possession of the present disclosure will appreciated that the VLAN 208 may be replaced with other networks while remaining within the scope of the present disclosure as well. As such, the computing system 202 includes a chassis 202a that may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a management module 202b that is configured to perform the functionality of the management modules and/or computing systems discussed below. In addition, the chassis 202a may house a communication system that couples the management module 202b to the VLAN 208, as well as a plurality of I/O modules 202c and up to 202d, each of which is coupled to the VLAN 208.

Similarly, the computing system 204 includes a chassis 204a that may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a management module 204b that is configured to perform the functionality of the management modules and/or computing systems discussed below. In addition, the chassis 204a may house a communication system that couples the management module 204b to the VLAN 208, as well as a plurality of I/O modules 204c and up to 204d, each of which is coupled to the VLAN 208. Similarly as well, the computing system 206 includes a chassis 206a that may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a management module 206b that is configured to perform the functionality of the management modules and/or computing systems discussed below. In addition, the chassis 206a may house a communication system that couples the management module 206b to the VLAN 208, as well as a plurality of I/O modules 206c and up to 206d, each of which is coupled to the VLAN 208. However, while a specific system management domain and network management domain synchronization system 200 has been illustrated and described, one of skill in the art in possession of the present disclosure will recognize that the system management domain and network management domain synchronization system of the present disclosure may include a variety of components and component configurations while remaining within the scope of the present disclosure as well.

Figure 3:
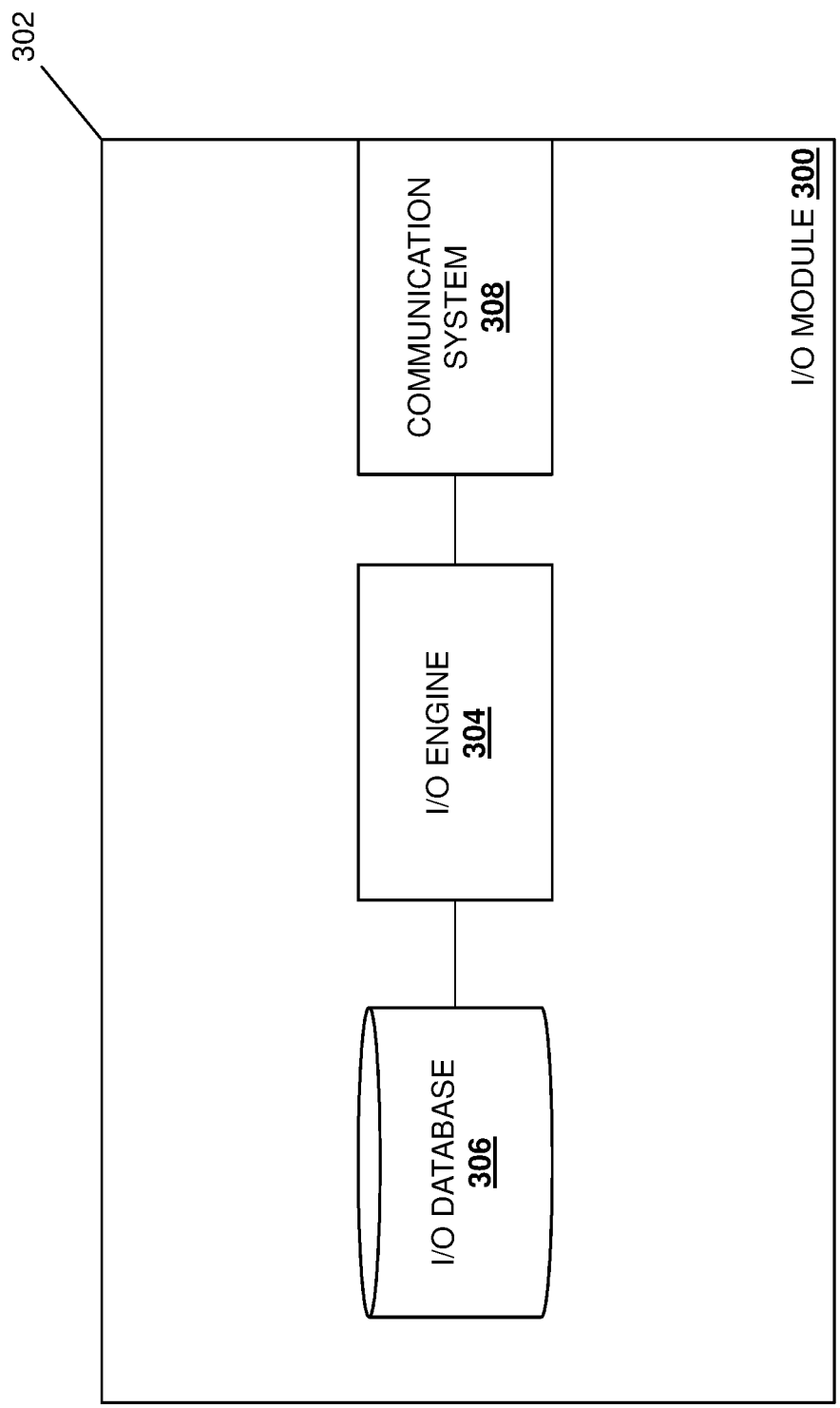
FIG. 3 is a schematic view illustrating an embodiment of an I/O module that may be provided in the system management domain and network management domain synchronization system.

Referring now to FIG. 3, an embodiment of an I/O module 300 is illustrated that may provide any or all of the I/O modules 202c, 202d, 204c, 204d, 206c, and 206d discussed above with reference to FIG. 2. In an embodiment, the I/O module 300 may be provided by the IHS 100 discussed above with reference to FIG. 1 and/or may include some or all of the components of the IHS 100. Furthermore, while illustrated and discussed as a I/O module, one of skill in the art in possession of the present disclosure will recognize that the functionality of the I/O module 300 discussed below may be provided by other devices that are configured to operate similarly as the I/O module discussed below. In the illustrated embodiment, the I/O module 300 includes a chassis 302 that houses the components of the I/O module 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a I/O engine 304 that is configured to perform the functionality of the I/O engines and/or I/O modules discussed below.

The chassis 302 may also house a storage system (not illustrated, but which may include the storage 108 discussed above with reference to FIG. 1) that is coupled to the I/O module 304 (e.g., via a coupling between the storage system and the processing system) and that includes a I/O database 306 that is configured to store any of the information utilized by the I/O engine 304 discussed below. The chassis 302 may also house a communication system 308 that is coupled to the I/O engine 304 (e.g., via a coupling between the communication system 308 and the processing system) and that may be provided by any of a variety of communication components that would be apparent to one of skill in the art in possession of the present disclosure. While a specific I/O module 300 has been illustrated, one of skill in the art in possession of the present disclosure will recognize that I/O modules (or other devices operating according to the teachings of the present disclosure in a manner similar to that described below for the I/O module 300) may include a variety of components and/or component configurations for providing conventional I/O device functionality, as well as the functionality discussed below, while remaining within the scope of the present disclosure as well.

Figure 4A:
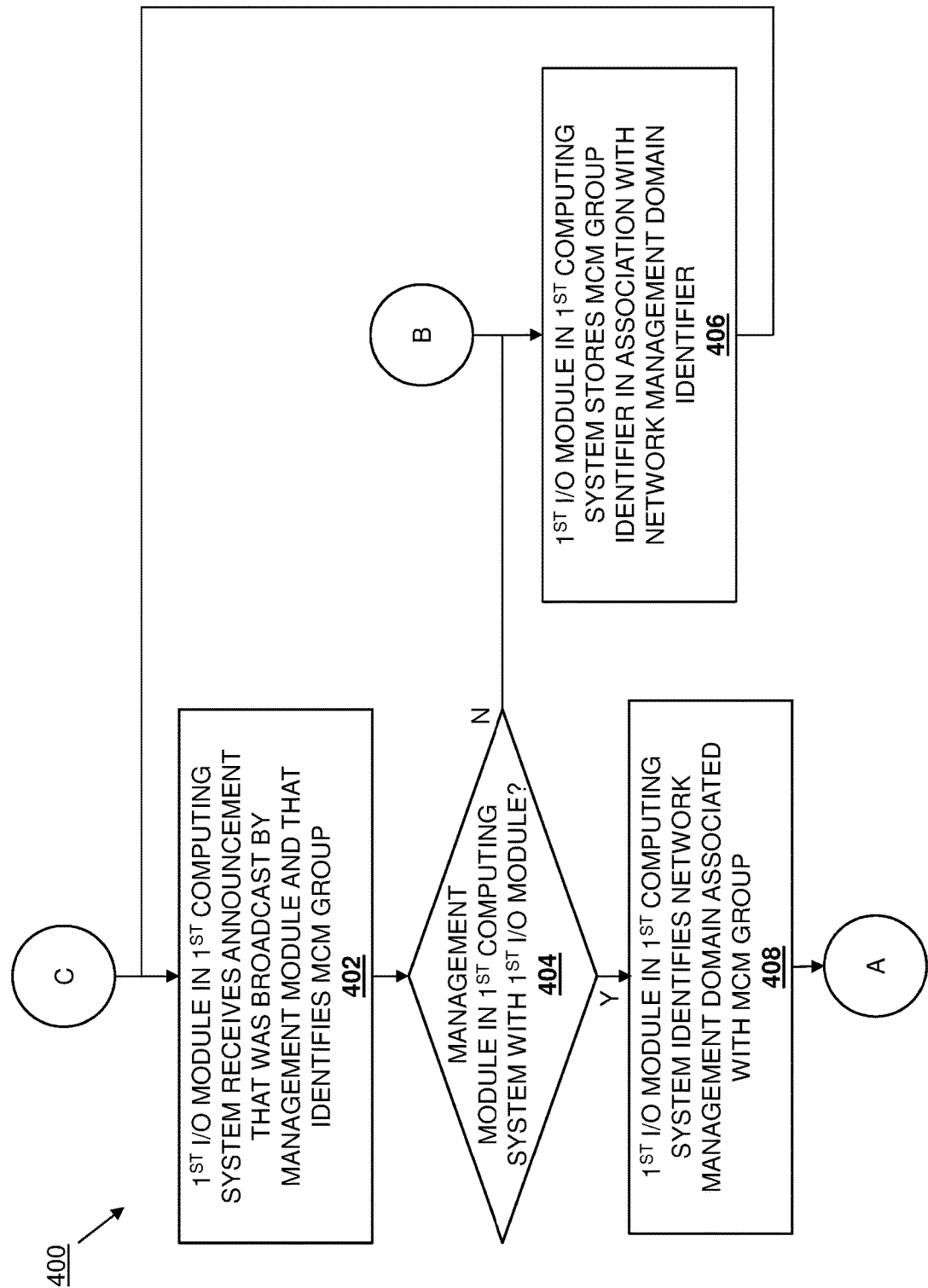
FIG. 4A is a flow chart illustrating an embodiment of a portion of a method for synchronizing a system management domain and a network management domain.
Figure 4B:
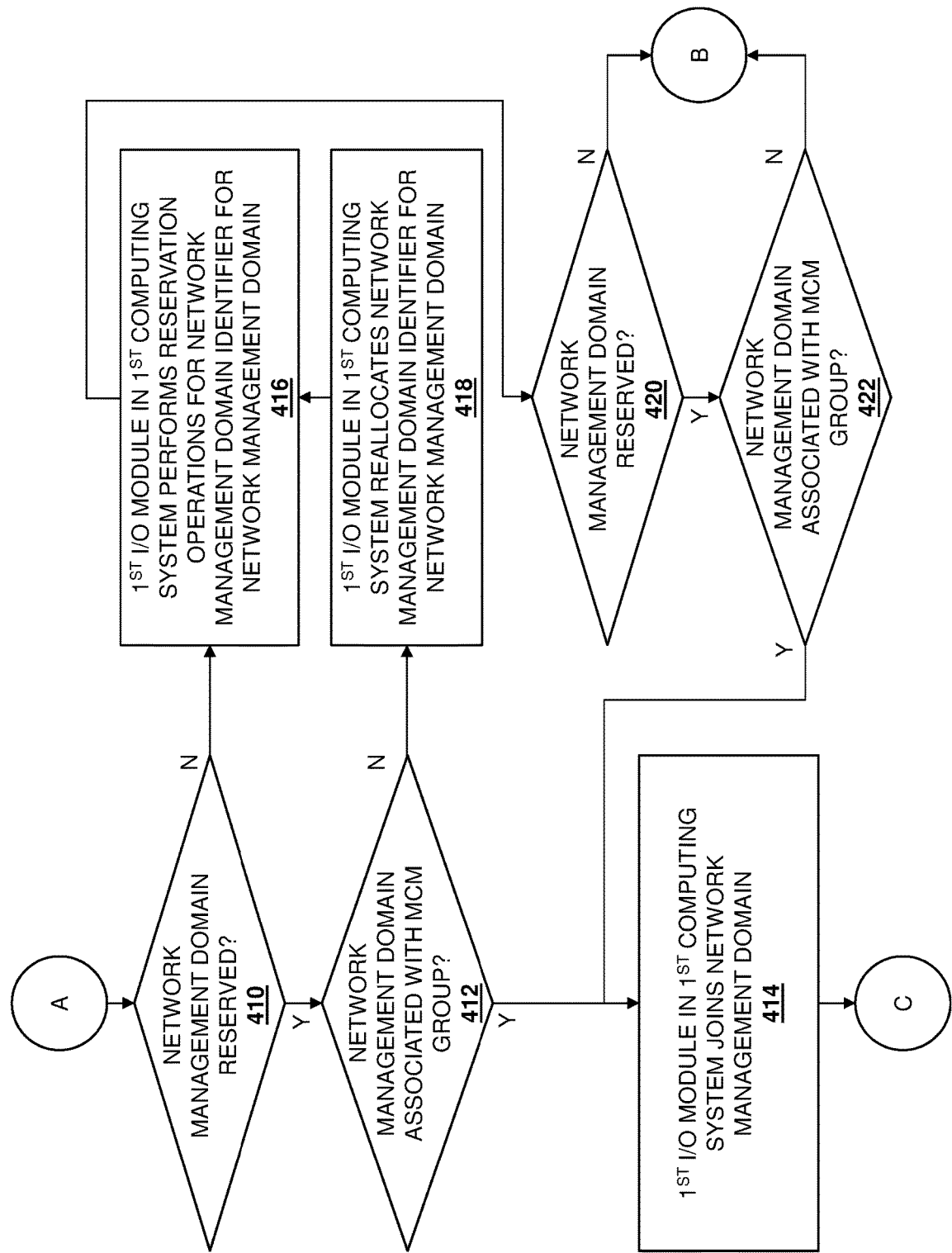
FIG. 4B is a flow chart illustrating an embodiment of the method for synchronizing a system management domain and a network management domain of FIG. 4A.

Referring now to FIGS. 4A and 4B, an embodiment of a method 400 for synchronizing a system management domain and a network management domain is illustrated. As discussed below, the systems and methods of the present disclosure provide for the scaling of a network management domain provided with a system management domain for an MCM group by providing I/O modules in computing systems that will leave the network management domain that they are providing for their computing system and join the network management domain provided with a system management domain for an MCM group when their computing system joins that MCM group. For example, a first computing system may belong to a first MCM group and may include a first computing system I/O module that belongs to a first network management domain, and a second computing system that is coupled to the first computing system may include a second computing system management module that joins the first MCM group that includes the first computing system and, in response, broadcasts a first announcement that includes a first MCM group identifier for the first MCM group. A second computing system I/O module in the second computing system will receive the first announcement, determine that the second computing system management module is included in the second computing system with the second computing system I/O module and, in response, join the first network management domain. As such, network management domains provided with system management domains for MCM groups may scale as computing systems join those MCM groups, rather than remaining separate such that different management access points are provided for the networking fabric within the system management domain.

Figure 8A:
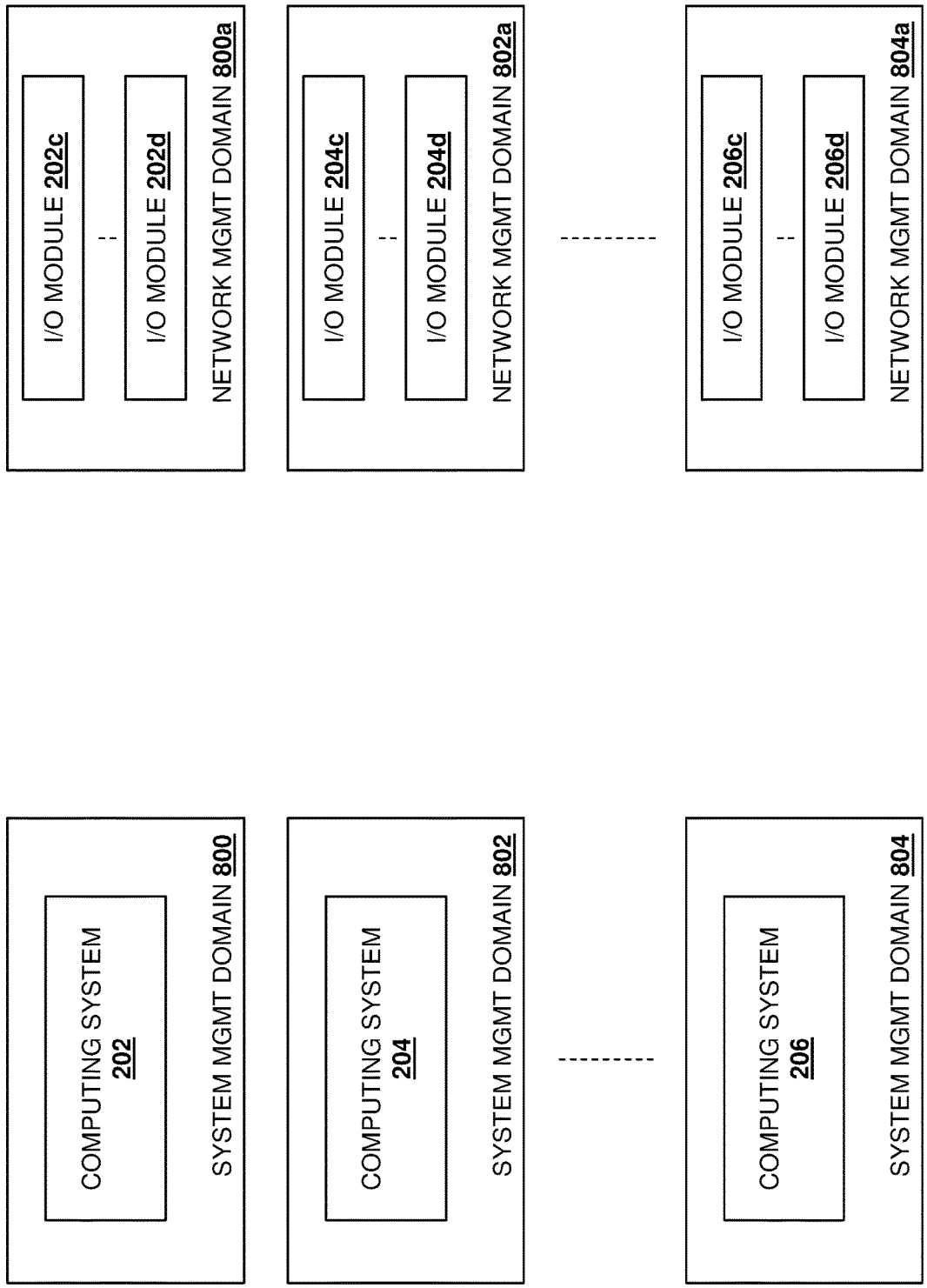
FIG. 8A is a schematic view illustrating an embodiment of the system management domain and network management domain synchronization system of FIG. 2 operating during the method of FIGS. 4A and 4B.

In an embodiment, during or prior to the method 400, each of the computing systems 202, 204, and up to 206 may be powered on, started up, reset, and/or other initialized, and may operate to join respective system management domains, with the respective I/O module(s) in each of those computing systems operating to provide a network management domain for their computing system/system management domain. As will be appreciated by one of skill in the art in possession of the present disclosure, in such a situation, each of the computing systems 202-206 may be thought of as belonging to an MCM group that includes only that computing system, with its own system management domain and an associated network management domain that is provided by the I/O modules in that computing system. The initialization of a computing system to join a system management domain/MCM group, and the provision of a network management domain for that system management domain/MCM group by the I/O module(s) in that computing system, is known in the art and thus not described detail. As such, with reference to FIG. 8A, the computing system 202 is illustrated as belonging to a system management domain 800 that is provided for a first MCM group to which that computing system 202 belongs, with the I/O modules 202c-202d in that computing system 202 operating to provide a network management domain 800a for that system management domain 800/first MCM group. Similarly, the computing system 204 is illustrated as belonging to a system management domain 802 that is provided for a second MCM group to which that computing system 204 belongs, with the I/O modules 204c-204d in that computing system 204 operating to provide a network management domain 802a for that system management domain 802/second MCM group, and the computing system 206 is illustrated as belonging to a system management domain 804 that is provided for a third MCM group to which that computing system 206 belongs, with the I/O modules 206c-206d in that computing system 206 operating to provide a network management domain 804a for that system management domain 804/third MCM group As will be appreciated by one of skill in the art in possession of the present disclosure, any of the computing systems 202, 204, and up to 206 may be grouped together in an MCM group. For example, the computing systems 202-206 provided in MCM groups according to the teachings of the present disclosure may support a variety of MCM grouping operations that may include MCM group creation operations such as configuring an MCM group name, defining a lead computing system for the MCM group, defining MCM group policies (e.g., configuration replication policies, approval policies, etc.) for the MCM group, and/or other MCM group creation operations that would be apparent to one of skill in the art in possession of the present disclosure. Furthermore, MCM grouping operations that may include MCM group member addition operations such as adding computing systems to an MCM group, joining an MCM group by a computing system, and/or other MCM group member addition operations that would be apparent to one of skill in the art in possession of the present disclosure.

Further still, MCM grouping operations that may include MCM group member removal operations such as removing computing systems from an MCM group, leaving an MCM group by a computing system, and/or other MCM group member removal operations that would be apparent to one of skill in the art in possession of the present disclosure. Further still, MCM grouping operations that may include MCM group dissolution operations. However, while several MCM grouping operations have been described, one of skill in the art in possession of the present disclosure will appreciate that any MCM grouping operations known in the art may be supported by the computing systems that are grouped in the MCM groups utilized in the present disclosure. As will be appreciated by one of skill in the art in possession of the present disclosure, the MCM grouping operations described above may be user-initiated operations that may be initiated by a user or administrator via, for example, a user interface or REpresentational State Transfer (REST) Application Programming Interface (API). In a specific example, the user or administrator may utilize a computing device (e.g., a mobile computing device such as a laptop/notebook computing device, a table computing device, mobile phone, etc.) running an OpenManage Mobile application available from DELL® Inc. of Round Rock, Tex., United States in order to initiate a MCM group computing system join operation with any of the computing devices 202-206 via, for example, a Quick Sync 2 BLUETOOTH® Low Energy (BLE)/WiFi wireless interface available from DELL® Inc. of Round Rock, Tex., United States. However, one of skill in the art in possession of the present disclosure will recognize that MCM group computing system join operations may be initiated in a variety of other manners that will fall within the scope of the present disclosure as well.

The method 400 begins at block 402 where a first I/O module in a first computing system receives an announcement that was broadcast by a management module and that identifies an MCM group. In an embodiment of block 402, the user or administrator may initiate the MCM group computing system join operation discussed above to cause a computing system to join a system management domain/MCM group currently provided for another computing system. For example, with reference to FIGS. 8A and 8B, the MCM group computing system join operation initiated by the user or administrator may cause the computing system 204 that belongs to the system management domain 802/second MCM group discussed above with reference to FIG. 8A to join the system management domain 800/first MCM group to which the computing system 202 belongs. The creating of a multi-computing system MCM group is known in the art, and thus one of skill in the art in possession of the present disclosure will recognize how the management modules 202b and 204b in the computing systems 202 and 204, respectively, may operate such that the computing system 204 leaves the system management domain 802/second MCM group and joins the system management domain 800/first MCM group to which the computing system 202 belongs. For example, the management modules 202b and 204b in the computing systems 202 and 204 may utilize an Open Authentication (OAuth)-based handshake mechanism that leverages factory identity certificates provided in each of the computing systems 202 and 204 in order to verify the identity of each of those computing systems before grouping them in the system management domain 800/first MCM group.

Figure 8B:
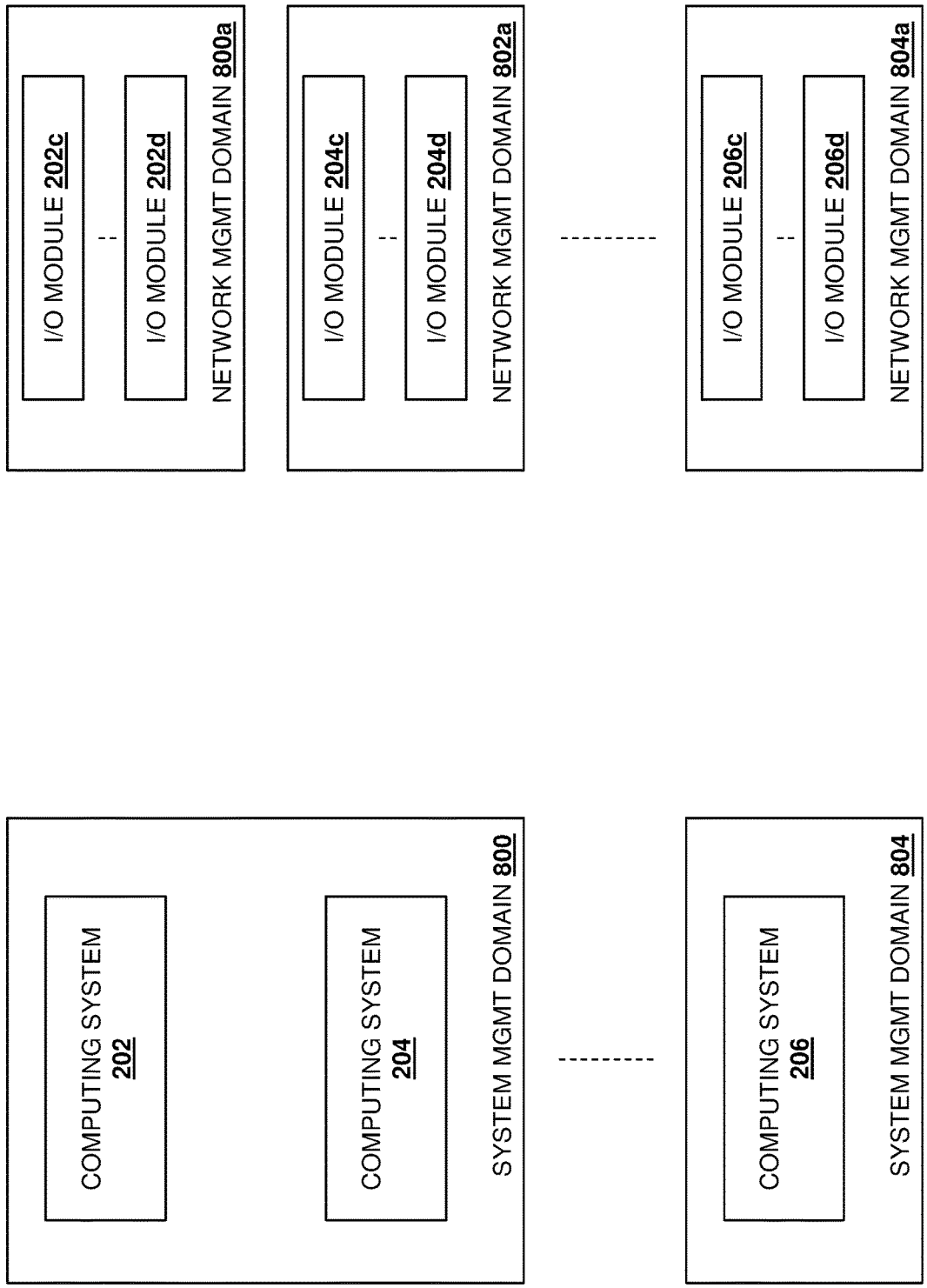
FIG. 8B is a schematic view illustrating an embodiment of the system management domain and network management domain synchronization system of FIG. 2 operating during the method of FIGS. 4A and 4B.

In this example, the computing system 202 is designated as the lead of the first MCM group by the user or administrator in the MCM group computing system join operations, while the computing system 204 is designated as a member of the MCM group by the user or administrator in the MCM group computing system join operations. As illustrated in FIG. 8B, in conventional MCM grouping systems, following the addition of the computing system 204 to the system management domain 800/first MCM group that includes the computing system 202, the I/O modules 202c-202c in the computing system 202 would continue to operate to provide the network management domain 800a, while the I/O modules 204c-204c in the computing system 204 would continue to operate to provide the network management domain 802a, and as discussed above, this would result in different management access points being provided for the networking fabric within the system management domain 800

Figure 5A:
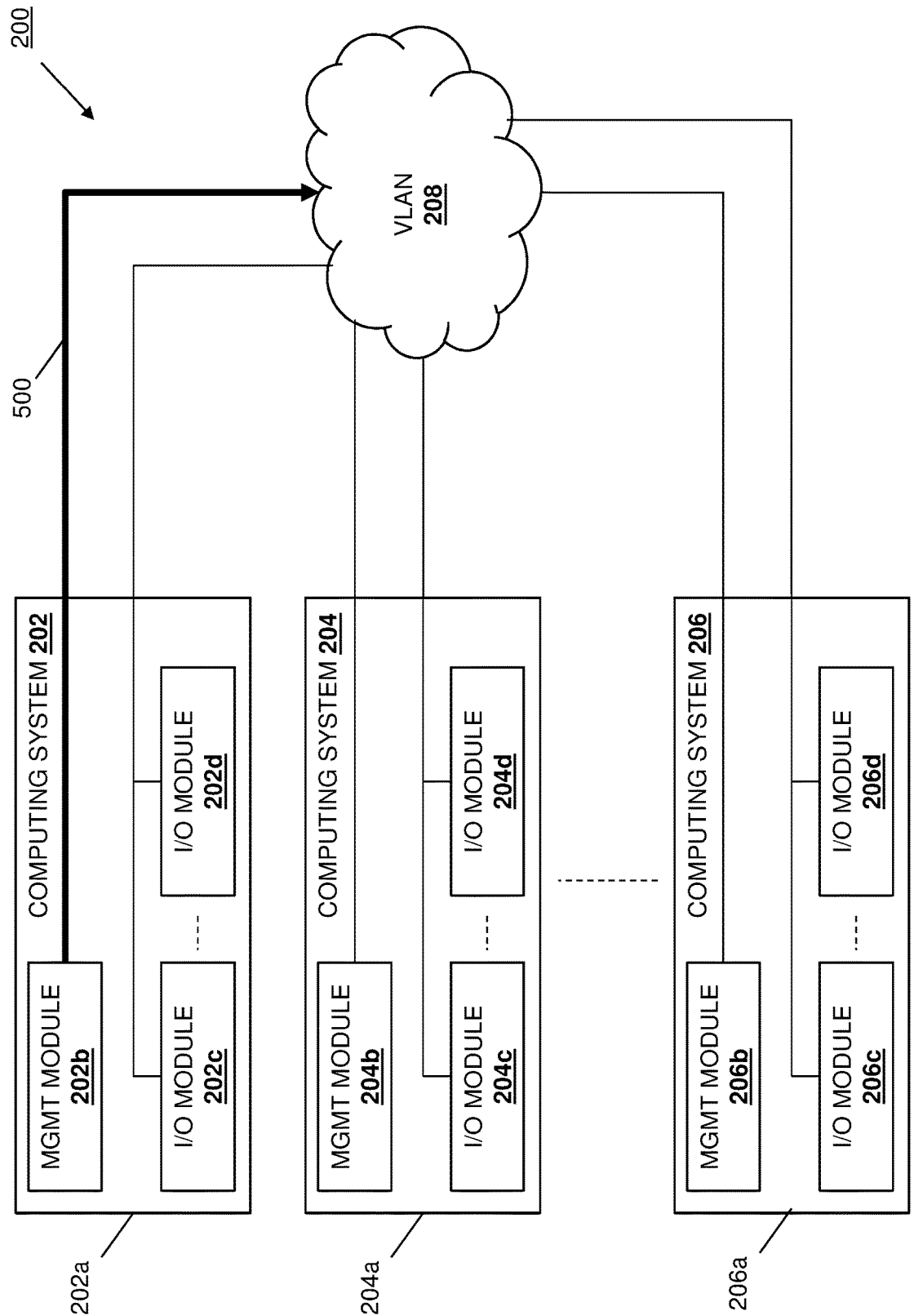
FIG. 5A is a schematic view illustrating an embodiment of the system management domain and network management domain synchronization system of FIG. 2 operating during the method of FIG. 4.
Figure 5B:
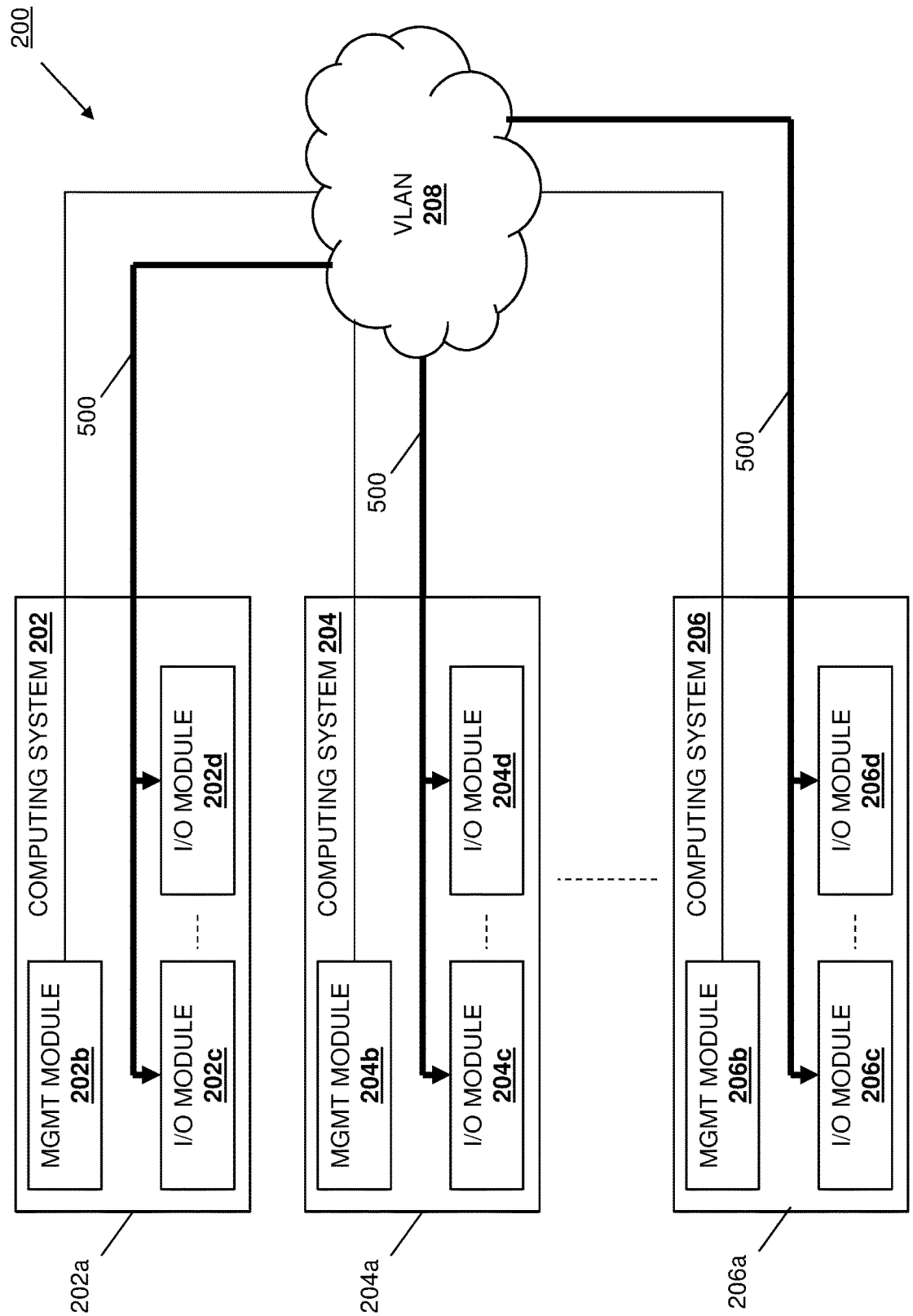
FIG. 5B is a schematic view illustrating an embodiment of the system management domain and network management domain synchronization system of FIG. 2 operating during the method of FIG. 4.

In an embodiment of block 402, the management module in any of the computing systems 202-206 that joins an MCM group including another computing system may operate to broadcast an announcement that includes an MCM group identifier for its MCM group and, in response, the I/O module(s) included in the computing systems 202-206 may receive that announcement. For example, the management module in any of the computing systems 202-206 may operate to broadcast a multicast Domain Name System (mDNS) announcement via the VLAN 208 that may include a chassis service tag for that computing system that uniquely identifies that computing system, an universally unique MCM group identifier for the MCM group to which that computing system belongs, the role of that computing system (e.g., a lead of the MCM group, a member of the MCM group, a stand-alone computing system, etc.), and/or any other mDNS announcement information that would be apparent to one of skill in the art in possession of the present disclosure. As such, FIGS. 5A and 5B illustrates how the management module 202b in the computing system 202 may broadcast an announcement 500 via the VLAN 208 such that the announcement 500 is received by the I/O modules 202c-202d in the computing system 202, the I/O modules 204c-204d in the computing system 204, and the I/O modules 206c-206d in the computing system 206.

Figure 6A:
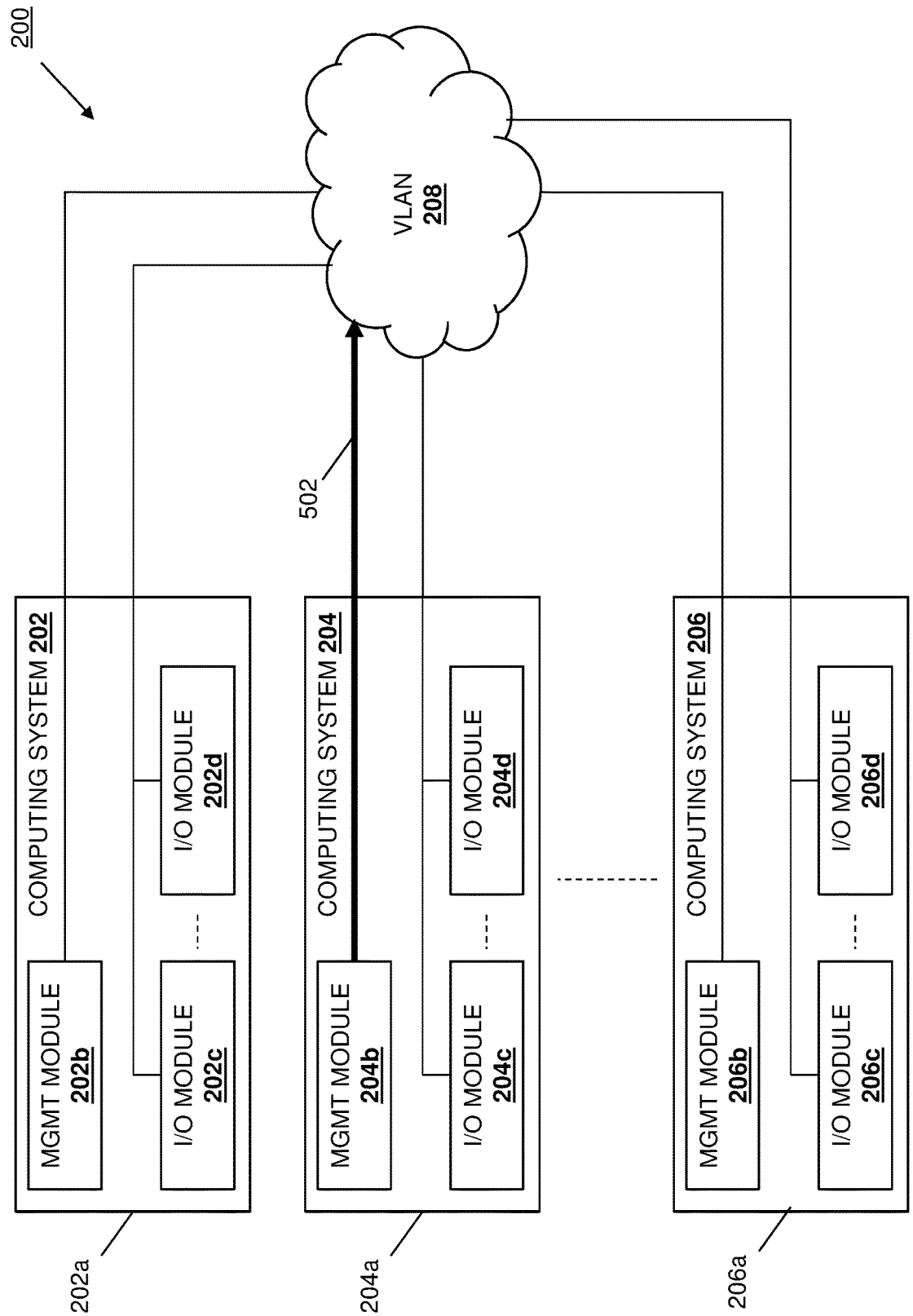
FIG. 6A is a schematic view illustrating an embodiment of the system management domain and network management domain synchronization system of FIG. 2 operating during the method of FIG. 4.
Figure 6B:
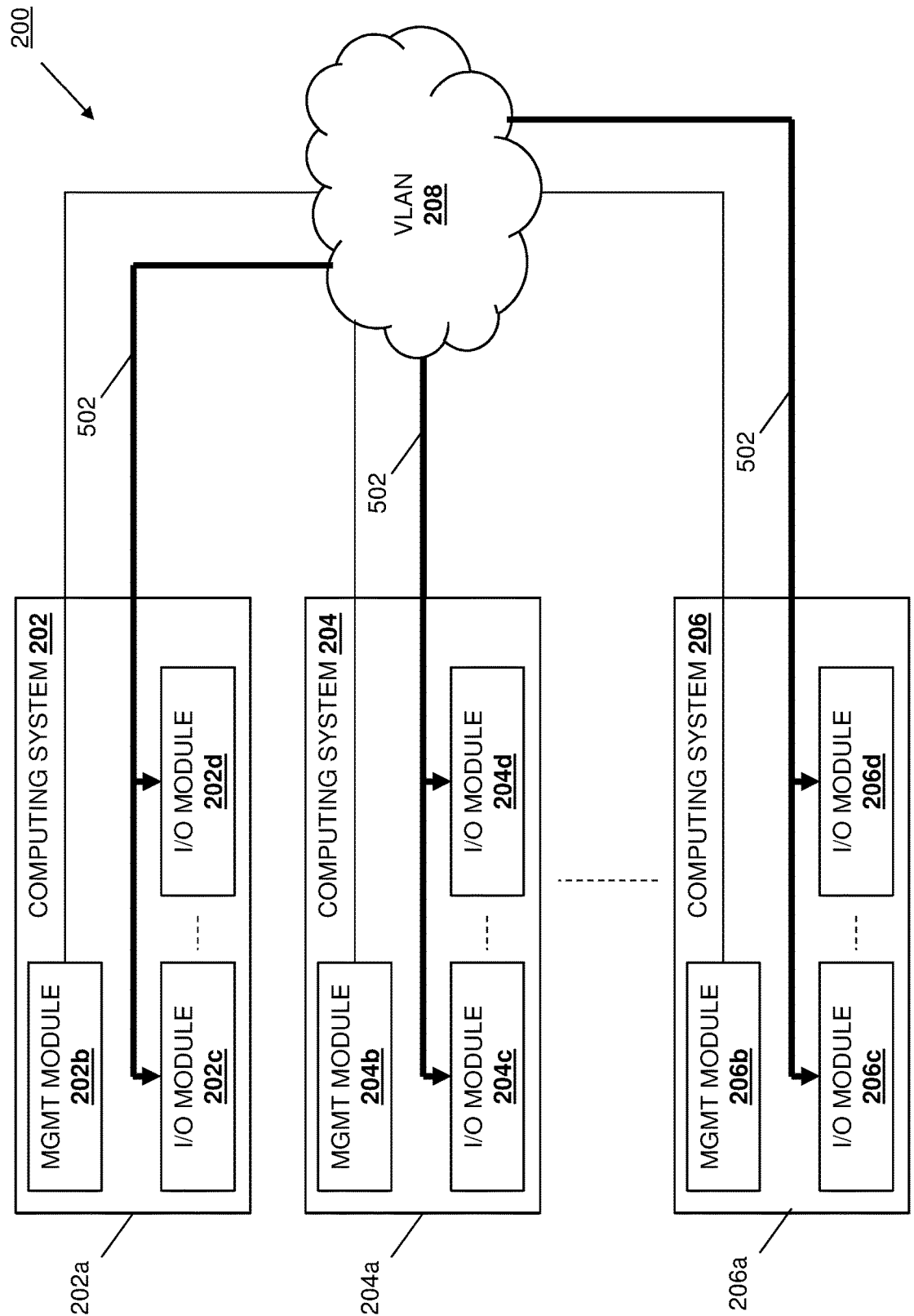
FIG. 6B is a schematic view illustrating an embodiment of the system management domain and network management domain synchronization system of FIG. 2 operating during the method of FIG. 4.
Figure 7A:
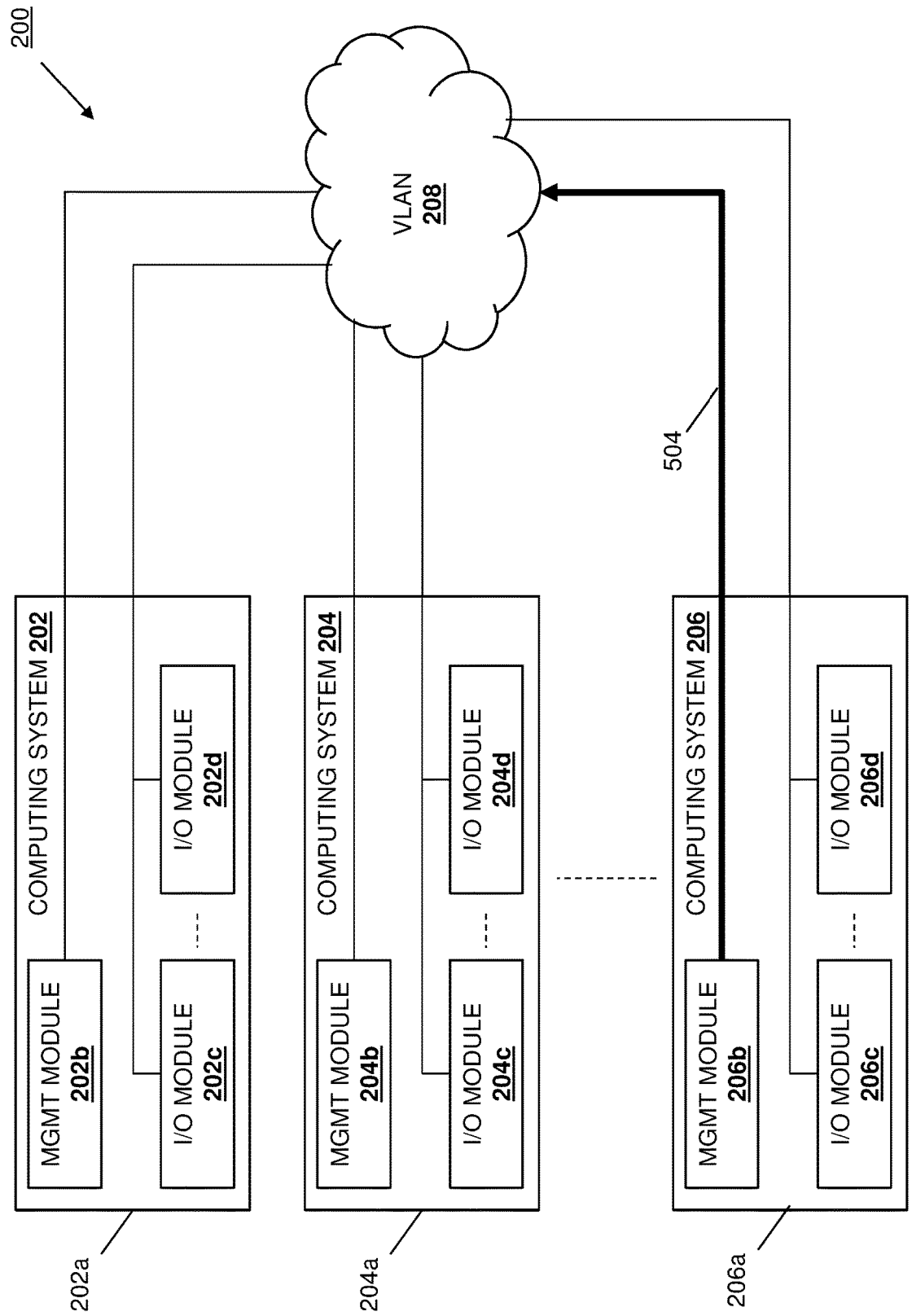
FIG. 7A is a schematic view illustrating an embodiment of the system management domain and network management domain synchronization system of FIG. 2 operating during the method of FIG. 4.
Figure 7B:
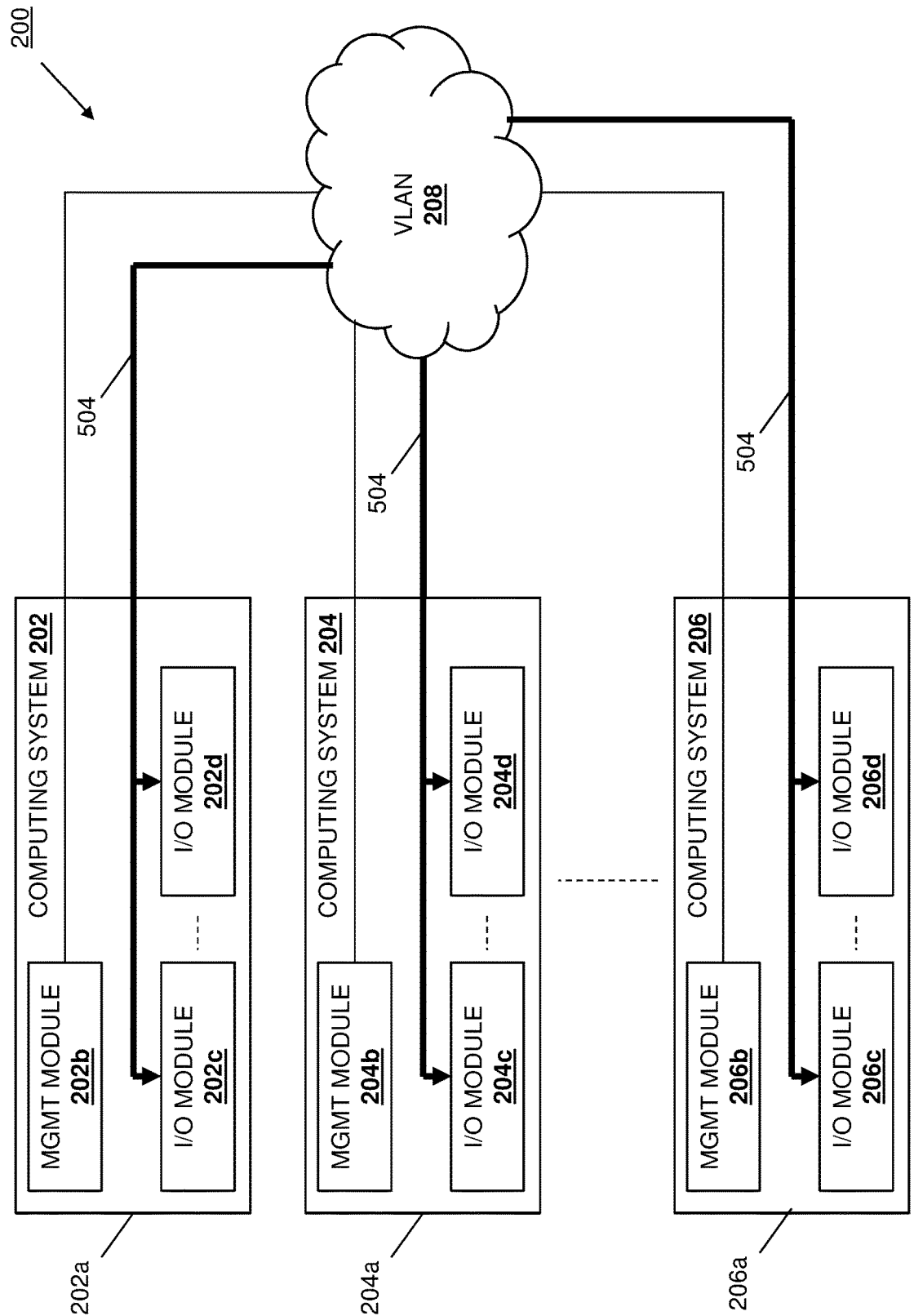
FIG. 7B is a schematic view illustrating an embodiment of the system management domain and network management domain synchronization system of FIG. 2 operating during the method of FIG. 4.

Similarly, FIGS. 6A and 6B illustrate how the management module 204b in the computing system 204 may broadcast an announcement 502 via the VLAN 208 such that the announcement 502 is received by the I/O modules 202c-202d in the computing system 202, the I/O modules 204c-204d in the computing system 204, and the I/O modules 206c-206d in the computing system 206. Similarly as well, FIGS. 7A and 7B illustrate how the management module 206b in the computing system 206 may broadcast an announcement 504 via the VLAN 208 such that the announcement 504 is received by the I/O modules 202c-202d in the computing system 202, the I/O modules 204c-204d in the computing system 204, and the I/O modules 206c-206d in the computing system 206. One of skill in the art in possession of the present disclosure will appreciate that while FIGS. 5A, 5B, 6A, 6B, 7A, and 7B illustrate how each of the management modules in the computing systems 202-206 are capable of broadcasting announcements, it is not necessary for all of the management modules to actually broadcast a respective announcement at block 402.

As will be appreciated by one of skill in the art in possession of the present disclosure, the announcements broadcast by the management modules in the computing systems 202-206 may be periodic announcements that change as the status of the computing systems as part of MCM groups change. For example, for the computing systems illustrated in FIG. 8A, announcements broadcast by the management module 202b in the computing system 202 may identify a chassis service tag for the computing system 202/chassis 202a that uniquely identifies that computing system 202/chassis 202a, an universally unique MCM group identifier for the MCM group/system management domain 800, the role of that computing system 202 (e.g., a stand alone role in this example), and/or any other announcement information that would be apparent to one of skill in the art in possession of the present disclosure. Similarly, announcements broadcast by the management module 204b in the computing system 204 may identify a chassis service tag for the computing system 204/chassis 204a that uniquely identifies that computing system 204/chassis 204a, an universally unique MCM group identifier for the MCM group/system management domain 802, the role of that computing system 204 (e.g., a stand alone role in this example), and/or any other announcement information that would be apparent to one of skill in the art in possession of the present disclosure. Similarly as well, announcements broadcast by the management module 206b in the computing system 206 may identify a chassis service tag for the computing system 206/chassis 206a that uniquely identifies that computing system 206/chassis 206a, an universally unique MCM group identifier for the MCM group/system management domain 804, the role of that computing system 206 (e.g., a stand alone role in this example), and/or any other announcement information that would be apparent to one of skill in the art in possession of the present disclosure.

As such, continuing with the example provided above in which the computing system 204 joins the system management domain 800/first MCM group to which the computing system 202 belongs, the management module 204b in the computing system 204 may broadcast the announcement (e.g., the announcement 502 as illustrated in FIG. 6A) via the VLAN 208 that may include a chassis service tag for the computing system 204/chassis 204a that uniquely identifies that computing system 204/chassis 204a, an universally unique MCM group identifier for the first MCM group/system management domain 800 to which that computing system now belongs, the role of that computing system (e.g., a member of the first MCM group/system management domain 800 in this example), and/or any other announcement information that would be apparent to one of skill in the art in possession of the present disclosure. In response, the I/O engine 304 in each I/O module 202c-202d/300, 204c-204d/300, and 206c-206d/300 may receive the announcement (e.g., the announcement 502 as illustrated in FIG. 6B) that identifies the system management domain 800/first MCM group via its communication system 308.

The method 400 then proceeds to decision block 404 where it is determined whether the management module is in the first computing system with the first I/O module. In an embodiment, at decision block 404, the I/O modules receiving announcements at block 402 may determine whether the management module broadcasting that announcement is included in its computing system/chassis. For example, as discussed above, announcements broadcast by management modules in the computing systems 202-206 may identify a chassis service tag for the computing system/chassis that uniquely identifies that computing system/chassis. As such, the announcement 502 broadcast by the management module 204b in the computing system 204 may identify a chassis service tag for the computing system 204/chassis 204a that uniquely identifies that computing system 204/chassis 204a, and the I/O engine 304 in each I/O module 202c-202d/300, 204c-204d/300, and 206c-206d/300 in the computing systems 202, 204, and 206 respectively, may utilize that chassis service tag to determine whether the management module 204b broadcasting the announcement 502 is in its computing system/chassis. However, while a specific example has been described, one of skill in the art in possession of the present disclosure will appreciate that other techniques from determining whether a message was broadcast by a subsystem in the same chassis as a subsystem receiving that message will fall within the scope of the present disclosure as well.

If, at decision block 404, it is determined that the management module is not in the first computing system with the first I/O module, the method 400 proceeds to block 406 where the first I/O module in the first computing system stores an MCM group identifier in association with a network management domain identifier. In an embodiment, at block 406, if the I/O engine 304 in the I/O module 300 determines at decision block 404 that the management module that broadcast the announcement 502 is not in its computing system/chassis, the I/O engine 304 in the I/O module 304 may operate at block 406 to store the MCM group identifier included in the announcement 504 in its I/O database 306 in association with a network management domain identifier for a network management domain provided for the system management domain/MCM group associated with that MCM group identifier. For example, in response to determining that the management module that broadcast the announcement 502 is not in its computing system/chassis, the I/O engine 304 in the I/O module 304 may operate to perform a hashing operation on the MCM group identifier in order to generate a network management domain identifier that identifies a network management domain provided for the system management domain/MCM group identified by that MCM group identifier (discussed in further detail below), and associate that MCM group identifier with the network management domain identifier in its I/O database 306.

As such, continuing the example above in which the management module 204b broadcast the announcement 502, the I/O engines 304 in the I/O modules 202c-202d/300 in the computing system 202 may determine that the management module 204b is in a different computing system/chassis (i.e., the computing system 204/chassis 204a) than its computing system 202/chassis 202a and, in response, may store the MCM group identifier received in the announcement 502 in their I/O databases 306 in association with a network management domain identifier generated from the MCM group identifier. Similarly, continuing the example above in which the management module 204*b* broadcast the announcement 502, the I/O engines 304 in the I/O modules 206*c*-206*d*/300 in the computing system 206 may determine that the management module 204*b* is in a different computing system/chassis (i.e., the computing system 204/chassis 204*a*) than its computing system 206/chassis 206*a* and, in response, may store the MCM group identifier received in the announcement 502 in their I/O databases 306 in association with a network management domain identifier generated from the MCM group identifier. The method 400 then returns to block 402. As such, the method 400 may loop through blocks 402, 404, and 406 such that the I/O modules associate MCM group identifiers with network management domain identifiers in their I/O databases whenever announcements are received from management modules that are not in the same computing system/chassis as those I/O modules.

If at decision block 404, it is determined that the management module is in the first computing system with the first I/O module, the method 400 proceeds to block 408 where the first I/O module in the first computing system identifies a network management domain associated with the MCM group. In an embodiment, at block 408, if the I/O engine 304 in the I/O module 300 determines at decision block 404 that the management module that broadcast the announcement 502 is in its computing system/chassis, the I/O engine 304 in the I/O module 304 may operate at block 406 to identify a network management domain associated with the MCM group identified by the MCM group identifier included in the announcement 502. For example, in response to determining that the management module that broadcast the announcement 502 is in its computing system/chassis, the I/O engine 304 in the I/O module 304 may operate to perform a hashing operation on the MCM group identifier in order to generate a network management domain identifier that identifies a network management domain provided for the system management domain/MCM group identified by that MCM group identifier. As such, continuing the example above in which the management module 204*b* broadcast the announcement 502, the I/O engines 304 in the I/O modules 204*c*-204*d*/300 in the computing system 204 may determine that the management module 204*b* is in its computing system/chassis (i.e., the computing system 204/chassis 204*a*) and, in response, may generate a network management domain identifier from the MCM group identifier via a hashing operation (e.g., a Secure Hash Algorithm (SHA)-256 hashing operation.)

As will be appreciated by one of skill in the art in possession of the present disclosure, the hashing operation may provide a shorter, fixed length value for the network management domain identifier (e.g., an 8-bit number) from the larger MCM group identifier, and may be utilized in the system to identify a network management domain provided for the system management domain/MCM group identified by that MCM group identifier. Thus, continuing with the example discussed above with reference to FIG. 8A, the hashing operation performed on the MCM group identifier that identifies the system management domain 800/first MCM group may produce a network management domain identifier that identifies the network management domain 800*a*, and thus the I/O modules 204*c*-204*d* in the computing system 204 may identify the network management domain 800*a* via the hashing operation performed on MCM group identifier for the system management domain 800/first MCM group at block 408.

The method 400 then proceeds to decision block 410 where it is determined whether the network management domain is reserved. In an embodiment, at decision block 410, the I/O engine 304 in the I/O modules that receives an announcement from a management module that is in the same computing system may operate to determine whether the network management domain identifier generated from the MCM group identifier in that announcement has been reserved (i.e., whether that network management domain identifier is currently being used to identify a network management domain for a system management domain/MCM group.) As will be appreciated by one of skill in the art in possession of the present disclosure, network management domains/network management domain identifiers may be reserved when they are associated with network management domains that are currently provided for system management domains/MCM groups, and not reserved when they are not associated with network management domains that are currently provided for system management domains/MCM groups. As such, network management domains identifier will not be reserved when a new MCM group is created for a computing system, and will be reserved when a computing system joins an existing MCM group. As such, the I/O engine 304 in the I/O modules 204*c*-204*d*/300 may operate at decision block 410 to determine whether the network management domain identifier generated at block 408 has been reserved by, for example, checking their I/O databases 306 to determine whether that network management domain identifier is associated with an MCM group identifier.

If, at decision block 410, it is determined that the network management domain is reserved, the method 400 proceeds to decision block 412 where it is determined whether the network management domain is associated with the MCM group. In an embodiment, for network management domain identifiers that are determined to be reserved at decision block 410, at decision block 412 the I/O engine 304 in the I/O modules will determine whether the network management domain identifier identifies a network management domain that is associated with the MCM group identified by the MCM group identifier received in the announcement at block 402. As such, continuing with the example above, the I/O engine 304 in the I/O modules 204*c*-204*d*/300 may determine whether the network management domain identifier generated at block 408 is associated with the MCM group identifier that was received in the announcement 502.

Figure 8C:
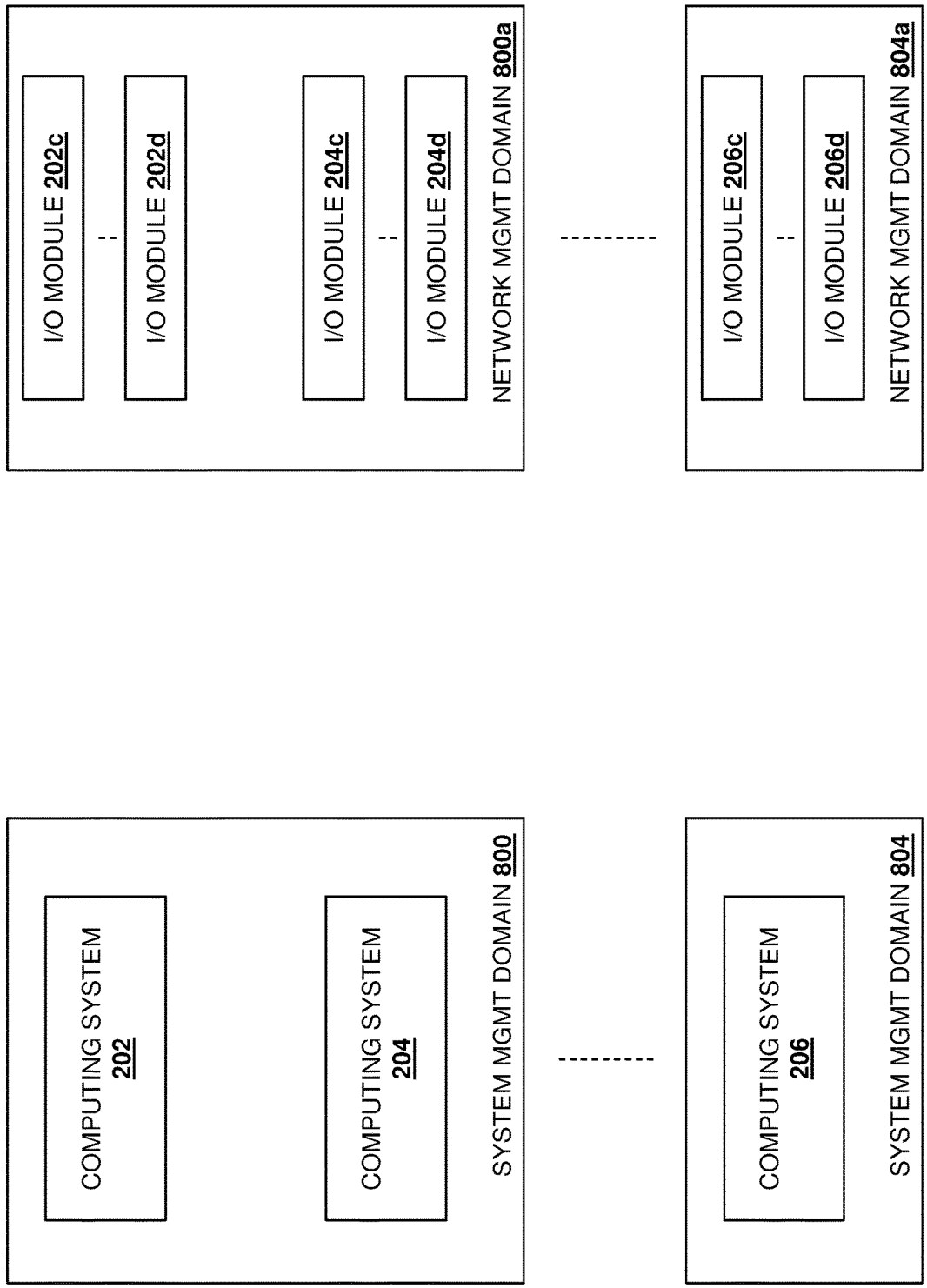
FIG. 8C is a schematic view illustrating an embodiment of the system management domain and network management domain synchronization system of FIG. 2 operating during the method of FIGS. 4A and 4B.

If, at decision block 412, it is determined that the network management domain is associated with the MCM group, the method 400 proceeds to block 414 where the first I/O module in the first computing system joins the network management domain. In an embodiment, in response to determining that the network management domain identifier generated at block 408 is reserved and associated with MCM group identifier that was received in the announcement at block 402, at block 414 the I/O modules 204*c*-204*d* in the computing system 204 that received that announcement may operate to join the network management domain provided for the MCM group identified by the MCM group identifier. As such, continuing with the example provided above and with reference to FIG. 8C, the I/O modules 204*c*-204*d* in the computing system 204 that received that announcement 502 may operate to leave the network management domain 802*a* and join the network management domain 800*a* that is provided for the system management domain 800/first MCM group by the I/O modules 202*c*-202*d* in the computing system 202.

As discussed above, the announcements broadcast by the management modules in the computing systems 202-206 may be periodic announcements that change as the status of the computing systems as part of MCM groups change. For example, for the computing systems illustrated in FIG. 8C, announcements broadcast by the management module 202b in the computing system 202 may identify a chassis service tag for the computing system 202/chassis 202a that uniquely identifies that computing system 202/chassis 202a, an universally unique MCM group identifier for the MCM group/system management domain 800, the role of that computing system 202 (e.g., a lead role for the first MCM group/system management domain 800 in this example), and/or any other announcement information that would be apparent to one of skill in the art in possession of the present disclosure. Similarly, announcements broadcast by the management module 204b in the computing system 204 may identify a chassis service tag for the computing system 204/chassis 204a that uniquely identifies that computing system 204/chassis 204a, an universally unique MCM group identifier for the MCM group/system management domain 800, the role of that computing system 204 (e.g., a member role for the first MCM group/system management domain 800 in this example), and/or any other announcement information that would be apparent to one of skill in the art in possession of the present disclosure. Similarly as well, announcements broadcast by the management module 206b in the computing system 206 may identify a chassis service tag for the computing system 206/chassis 206a that uniquely identifies that computing system 206/chassis 206a, an universally unique MCM group identifier for the MCM group/system management domain 804, the role of that computing system 206 (e.g., a stand alone role in this example), and/or any other announcement information that would be apparent to one of skill in the art in possession of the present disclosure.

Figure 8D:
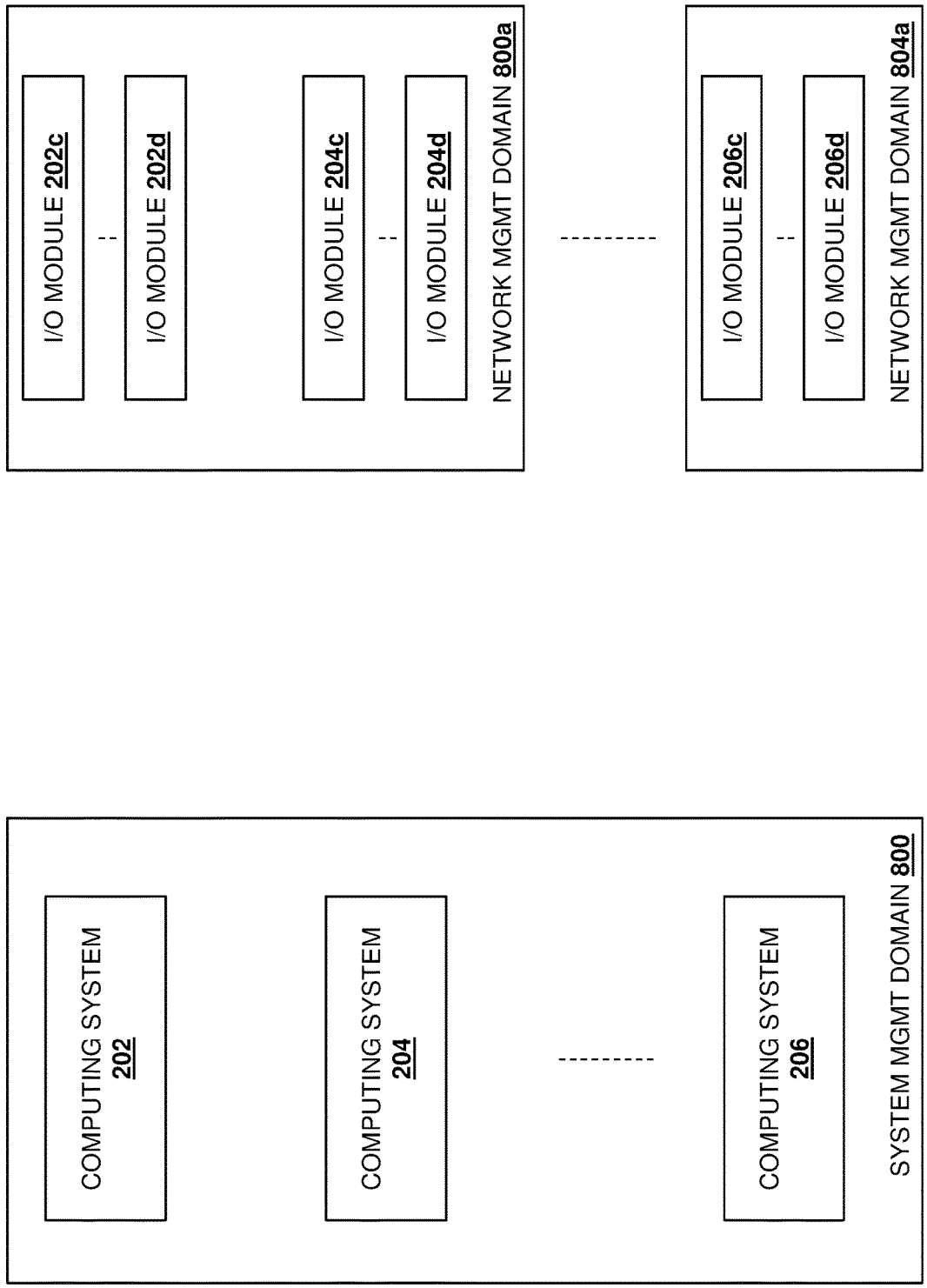
FIG. 8D is a schematic view illustrating an embodiment of the system management domain and network management domain synchronization system of FIG. 2 operating during the method of FIGS. 4A and 4B.
Figure 8E:
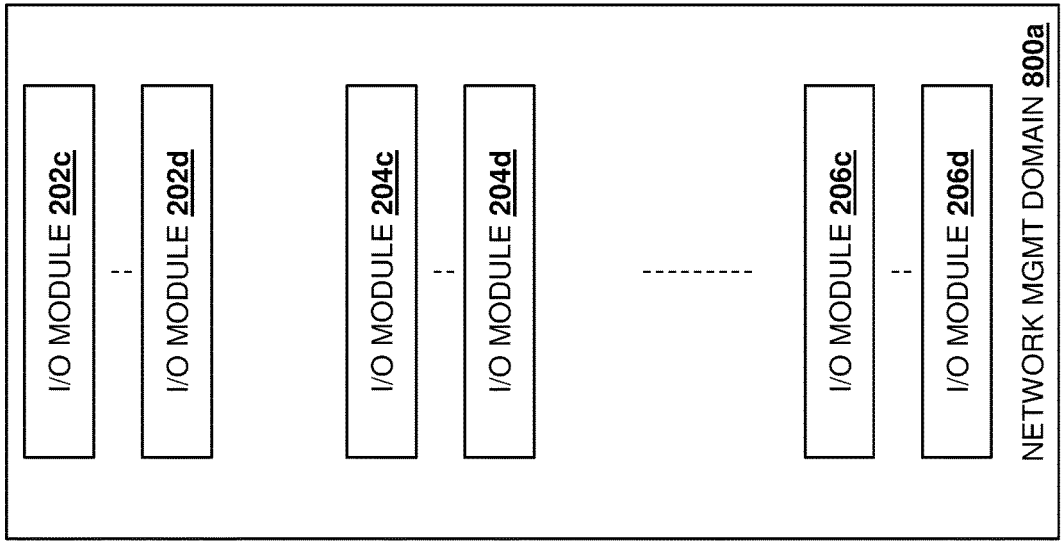
FIG. 8E is a schematic view illustrating an embodiment of the system management domain and network management domain synchronization system of FIG. 2 operating during the method of FIGS. 4A and 4B.
Figure 8E:
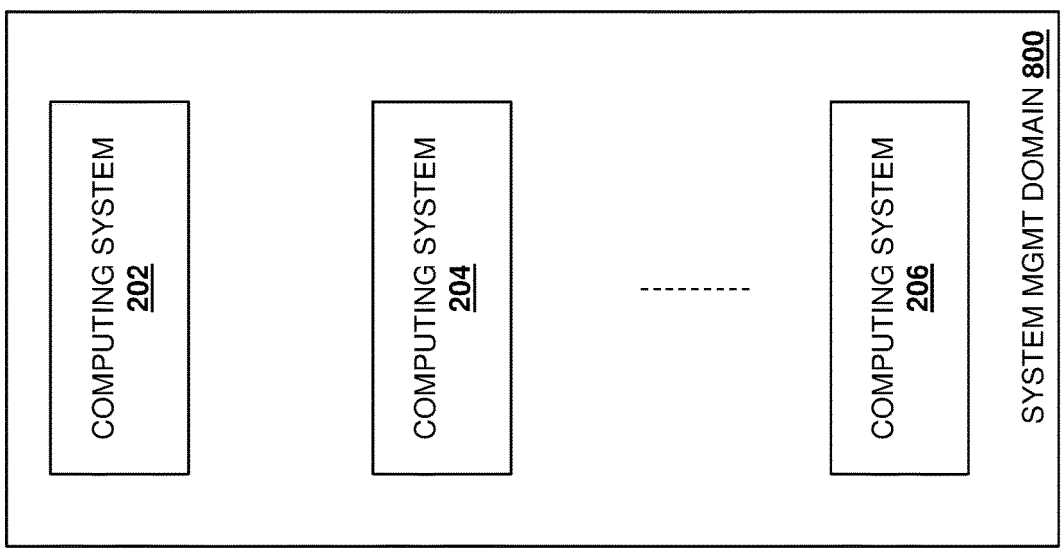

The method 400 then returns to block 402. As such, the method 400 may loop through blocks 402, 404, 408, 410, 412, and 414 such that I/O modules receiving announcements from management modules in their computing systems/chassis that have joined a new system management domain/MCM group will operate to join the network management domain provided for that system management domain/MCM group. For example, FIGS. 8D and 8E illustrate how blocks 402, 404, 408, 410, 412, and 414 of the method 400 may provide for the computing system 206 to join the system management domain 800/first MCM group, and how the I/O modules 206c-206d in that computing system 206 may join the network management domain 800a provided for the system management domain 800/first MCM group, rather than provide a separate network management domain 804a as would occur in conventional systems.

As discussed above, the announcements broadcast by the management modules in the computing systems 202-206 may be periodic announcements that change as the status of the computing systems as part of MCM groups change. For example, for the computing systems illustrated in FIG. 8E, announcements broadcast by the management module 202b in the computing system 202 may identify a chassis service tag for the computing system 202/chassis 202a that uniquely identifies that computing system 202/chassis 202a, an universally unique MCM group identifier for the MCM group/system management domain 800, the role of that computing system 202 (e.g., a lead role for the first MCM group/system management domain 800 in this example), and/or any other announcement information that would be apparent to one of skill in the art in possession of the present disclosure. Similarly, announcements broadcast by the management module 204b in the computing system 204 may identify a chassis service tag for the computing system 204/chassis 204a that uniquely identifies that computing system 204/chassis 204a, an universally unique MCM group identifier for the MCM group/system management domain 800, the role of that computing system 204 (e.g., a member role for the first MCM group/system management domain 800 in this example), and/or any other announcement information that would be apparent to one of skill in the art in possession of the present disclosure. Similarly as well, announcements broadcast by the management module 206b in the computing system 206 may identify a chassis service tag for the computing system 206/chassis 206a that uniquely identifies that computing system 206/chassis 206a, an universally unique MCM group identifier for the MCM group/system management domain 800, the role of that computing system 206 (e.g., a member role for the first MCM group/system management domain 800 in this example), and/or any other announcement information that would be apparent to one of skill in the art in possession of the present disclosure.

Furthermore, while not described in detail, one of skill in the art in possession of the present disclosure will appreciate that computing systems leaving a system management domain/MCM group may have their I/O modules leave the associated network management domain provided for that system management domain/MCM group. Thus, network management domains provided for system management domains/MCM groups may scale with the computing systems/I/O modules added to those system management domains, thus preventing the provisioning of different management access points for the networking fabric within those system management domains.

If, at decision block 410, it is determined that the network management domain is not reserved, the method 400 proceeds to block 416 where the first I/O module in the first computing system performs reservations operations for a network management domain identifier for the network management domain. In an embodiment, if the network management domain identifier generated at block 408 is not reserved, at block 416 the I/O engine 304 in the I/O modules 204c-204d may operate to perform reservation operations for that network management domain identifier. As discussed above, network management domains identifier will not be reserved when a new MCM group is created for a computing system, and thus block 416 may be performed in situations like those that result in the embodiment illustrated in FIG. 8A where the computing system 204 has joined its own system management domain 802, and the I/O modules 204c-204d must reserve the network management domain identifier for the network management domain 802a that they will be providing for the system management domain/second MCM group. As will be appreciated by one of skill in the art in possession of the present disclosure, reservation operations for a network management domain identifier may include advertising a "reserving" status for the network management domain identifier for some time period (e.g., 5 seconds), following by advertising a "reserved" status for the network management domain identifier.

If, at decision block 412, it is determined that the network management domain is not associated with the MCM group, the method 400 proceeds to block 418 where the first I/O module in the first computing system reallocates the network management domain identifier for the network management domain. In an embodiment, if the network management domain identifier generated at block 408 is reserved but not associated with the MCM group identified in the announcement 504, at block 418 the I/O engine 304 in the I/O modules 204c-204d may operate to reallocate that network management domain identifier. As will be appreciated by one of skill in the art in possession of the present disclosure, the hashing operation used to generate the network management domain identifier may result in hash value clashes (e.g., duplicate hash values for different MCM group identifiers) in rare cases, and the reallocation of the network management domain identifier may be performed to address such hash value clashes.

For example, network management domain identifier reallocation operations may include selecting a new value for the network management domain identifier at random, and determining whether that network management domain identifier provides a hash value clash. If no hash value clash exists with the new network management domain identifier, that network management domain identifier may be utilized. If a hash value clash exists with the new network management domain identifier, the process may be repeated until no hash value clash exists. In an embodiment, the same network management domain identifier algorithm may run on each of the computing systems for consistent network management domain identifier generation, and each computing system may ensure the for each MCM group identifier, a unique network management domain identifier is allocated. The method 400 then proceeds to blocks 416 where the I/O modules 204c-204d perform the reservation operations substantially as described above.

Following block 416, the method 400 proceeds to decision block 420 where it is determined whether the network management domain is reserved. In an embodiment, at decision block 420 and following the performance of the reservations operations at block 416, the I/O engine 304 in the I/O modules 204c-204d in the computing system 204 may operate to determine whether the network management domain identifier was reserved. As will be appreciated by one of skill in the art in possession of the present disclosure, the network management domain identifier may be reserved if it is available, but may not be reserved in the event the network management domain identifier is already associated with any other MCM group identifier. As such, the I/O engine 304 in the I/O modules 204c-204d in the computing system 204 may operate at decision block 420 to determine whether the reservation operations at block 416 succeeded or failed.

If, at decision block 420, it is determined that the network management domain is reserved, the method 400 proceeds to decision block 422 where it is determined whether the network management domain is associated with an MCM group. In an embodiment, at decision block 422, the I/O engine 304 in the I/O modules will determine whether the network management domain identifier identifies a network management domain that is associated with an MCM group for the computing system that includes that I/O module. As such, continuing with the example above, the I/O engine 304 in the I/O modules 204c-204d/300 may determine whether the network management domain identifier generated at block 408 is associated with the MCM group identifier for the MCM group that the computing system 204 is joining. If at decision block 420 it is determined that the network management domain is not reserved, or if at decision block 422 it is determined that the network management domain is not associated with the MCM group that the computing system 204 is joining, the method 400 proceeds to block 406 where the first I/O module in the first computing system stores the MCM group identifier in association with the network management domain identifier substantially as discussed above.

If at decision block 420 it is determined that the network management domain is reserved, or if at decision block 422 it is determined that the network management domain is associated with the MCM group that the computing system 204 is joining, the method 400 proceeds to block 414 where the first I/O module in the first computing system joins the network management domain substantially as described above. As such, for network management domains that are not reserved (at decision block 410) or associated with the MCM group (at block 412) identified in the announcement received at block 402, blocks 416, 418, 420, and/or 422 provide for the I/O modules to reserve and provide those network management domains for the system management domain/MCM group joined by their computing systems.

Thus, systems and methods have been described that provide for the scaling of a network management domain provided with a system management domain for a MCM group by providing I/O modules in computing systems that will leave the network management domain that they are providing for their computing system and join the network management domain provided with a system management domain for an MCM group when their computing system joins that MCM group. For example, a first computing system may belong to a first MCM group and that includes a first computing system I/O module that belongs to a first network management domain, and a second computing system that is coupled to the first computing system may include a second computing system management module that joins the first MCM group that includes the first computing system and, in response, broadcasts a first announcement that includes a first MCM group identifier for the first MCM group. A second computing system I/O module in the second computing system will receive the first announcement, determine that the second computing system management module is included in the second computing system with the second computing system I/O module and, in response, join the first network management domain. As such, network management domains provided with system management domains for MCM groups may scale as computing systems join those MCM groups, rather than remaining separate such that different management access points are provided for the networking fabric within the system management domain, by automatically reacting to MCM Group membership changes to realign the networking cluster boundary by synchronizing different management domains (system and network) for one or more MCM groups provided with the same VLAN. As such, the computing systems in the MCM group may operate as a single system with a single system management domain and a single network management domain, allowing the physical resources in those computing systems to be managed as a single system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system management domain and network management domain synchronization system, comprising:

a first computing system that belongs to a first Multi-Chassis Management (MCM) group and that includes a first computing system Input/Output (I/O) module that belongs to a first network management domain; and
a second computing system that is coupled to the first computing system, wherein the second computing system includes:
 a second computing system management module that includes at least one processor that is configured to:
  join a second MCM group; and
  broadcast, in response to joining the second MCM group, a second announcement that includes a second MCM group identifier for the second MCM group; and
 a second computing system Input/Output (I/O) module that includes at least one processor that is configured to:
  receive the second announcement that was broadcast by the at least one processor included in the second computing system management module and that includes the second MCM group identifier for the second MCM group;
  determine, in response to receiving the second announcement, that the second computing system management module is included in the second computing system with the second computing system I/O module; and
  join, in response to receiving the second MCM group identifier for the second MCM group in the second announcement broadcast by the second computing system management module and determining that the second computing system management module is included in the second computing system with the second computing system I/O module, a second network management domain,
 wherein the at least one processor included in the second computing system management module is configured, subsequent to joining the second MCM group, to:
  join the first MCM group that includes the first computing system; and
  broadcast, in response to joining the first MCM group, a first announcement that includes a first MCM group identifier for the first MCM group, and
 wherein the at least one processor included in the second computing system Input/Output (I/O) module is configured, subsequent to joining the second network management domain, to:
  receive the first announcement that was broadcast by the at least one processor included in the second computing system management module and that includes the first MCM group identifier for the first MCM group;
  determine, in response to receiving the first announcement, that the second computing system management module is included in the second computing system with the second computing system I/O module; and
  leave, in response to receiving the first MCM group identifier for the first MCM group in the first announcement broadcast by the second computing system management module and determining that the second computing system management module is included in the second computing system with the second computing system I/O module, the second network management domain and join the first network management domain.

2. The system of claim 1, wherein each of the first announcement and the second announcement include a multicast Domain Name System (mDNS) announcement.

3. The system of claim 1, further comprising:
 a third computing system that is coupled to the first computing system and the second computing system, wherein the third computing system includes:
  a third computing system management module that includes at least one processor that is configured to:
   join the first MCM group that includes the first computing system and the second computing system; and
   broadcast, in response to joining the first MCM group, a third announcement that includes the first MCM group identifier for the first MCM group; and
  a third computing system I/O module that includes at least one processor that is configured to:
   receive the third announcement that was broadcast by the third computing system management module and that includes the first MCM group identifier for the first MCM group;
   determine, in response to receiving the third announcement, that the third computing system management module is included in the third computing system with the third computing system I/O module; and
   join, in response to receiving the first MCM group identifier for the first MCM group in the third announcement broadcast by the third computing system management module, and determining that the third computing system management module is included in the third computing system with the third computing system I/O module, the first network management domain.

4. The system of claim 1, wherein the at least one processor included in the second computing system I/O module is configured to:
 perform a hashing operation on the second MCM group identifier for the second MCM group received in the second announcement to generate a second network management domain identifier for the second network management domain; and
 use the second network management domain identifier to join the second network management domain.

5. The system of claim 4, wherein the using the second network management domain identifier to join the second network management domain includes:
 determining that the second network management domain identifier is associated with the second MCM group identifier in a database.

6. The system of claim 1, wherein the at least one processor included in the second computing system I/O module is configured to:
 perform a hashing operation on the first MCM group identifier for the first MCM group received in the first announcement to generate a first network management domain identifier for the first network management domain; and
 use the first network management domain identifier to join the first network management domain.

7. An Information Handling System (IHS), comprising:
 a processing system including at least one processor; and
 a memory system that is coupled to the processing system and that includes instructions that, when executed by the at least one processor included in the processing system, cause the at least one processor included in the processing system to provide an Input/Output (I/O) engine that is configured to:
receive a first announcement that was broadcast by a first management module and that includes a first MCM group identifier for a first Multi-Chassis Management (MCM) group;
determine, in response to receiving the first announcement, that the first management module is included in a first chassis with the I/O engine; and
join, in response to receiving the first MCM group identifier for the first MCM group in the first announcement broadcast by the first management module and determining that the first management module is included in the first chassis with the I/O engine, a first network management domain, and
wherein the I/O engine is configured, subsequent to joining the first network management domain, to:
receive a second announcement that was broadcast by the first management module and that includes a second MCM group identifier for a second MCM group;
determine, in response to receiving the second announcement, that the first management module is included in the first chassis with the I/O engine; and
leave, in response to receiving the second MCM group identifier for the second MCM group in the second announcement broadcast by the first management module and determining that the first management module is included in the first chassis with the I/O engine, the first network management domain and join a second network management domain that is provided by at least one I/O module in a second chassis that is included in the second MCM group.

8. The IHS of claim 7, wherein each of the first announcement and the second announcement include a multicast Domain Name System (mDNS) announcement.

9. The IHS of claim 7, wherein the I/O engine is configured to:
perform a hashing operation on the first MCM group identifier for the first MCM group received in the first announcement to generate a first network management domain identifier for the first network management domain; and
use the first network management domain identifier to join the first network management domain.

10. The IHS of claim 9, wherein the using the first network management domain identifier to join the first network management domain includes:
determining that the first network management domain identifier is associated with the first MCM group identifier in a database.

11. The IHS of claim 7, wherein the I/O engine is configured to:
perform a hashing operation on the second MCM group identifier for the second MCM group received in the second announcement to generate a second network management domain identifier for the second network management domain; and
use the second network management domain identifier to join the second network management domain.

12. The IHS of claim 11, wherein the joining the first network management domain includes:
performing a hashing operation on the first MCM group identifier for the first MCM group received in the first announcement to generate a first network management domain identifier for the first network management domain;
determining that the first network management domain identifier is not associated with the first MCM group identifier in a database; and
performing network management domain identifier reservation operations for the first network management domain identifier to join the first network management domain.

13. The IHS of claim 7, wherein the I/O engine is configured to:
receive a third announcement that was broadcast by the first management module and that includes a third MCM group identifier for a third MCM group;
determine, in response to receiving the third announcement, that the first management module is included in the first chassis with the I/O engine;
leave, in response to receiving the third MCM group identifier for the third MCM group in the third announcement broadcast by the first management module and determining that the first management module is included in the first chassis with the I/O engine, the second network management domain and provide a third network management domain for the third MCM group.

14. A method for synchronizing a system management domain and a network management domain, comprising:
receiving, by at least one processor included in a first Input/Output (I/O) module in a first computing system, a first announcement that was broadcast by a first management module and that includes a first MCM group identifier for a first MCM group;
determining, by the at least one processor included in the first I/O module in the first computing system in response to receiving the first announcement, that the first management module is included in the first computing system with the first I/O module;
joining, by the at least one processor included in the first I/O module in the first computing system in response to receiving the first MCM group identifier for the first MCM group in the first announcement broadcast by the first management module and determining that the first management module is included in the first computing system with the first I/O module, a first network management domain;
receiving, by the at least one processor included in the first I/O module in the first computing system subsequent to joining the first network management domain, a second announcement that was broadcast by the first management module and that includes a second MCM group identifier for a second MCM group;
determining, by the at least one processor included in the first I/O module in the first computing system in response to receiving the second announcement, that the first management module is included in the first computing system with the first I/O module; and
leaving, by the at least one processor included in the first I/O module in the first computing system in response to receiving the second MCM group identifier for the second MCM group in the second announcement broadcast by the first management module and determining that the first management module is included in the first computing system with the first I/O module, the first network management domain and joining a second network management domain that is provided by at least one second I/O module in a second computing system that is included in the second MCM group.

15. The method of claim 14, wherein each of the first announcement and the second announcement include a multicast Domain Name System (mDNS) announcement.

16. The method of claim 14, further comprising:
performing, by the at least one processor included in the first I/O module in the first computing system, a hashing operation on the first MCM group identifier for the first MCM group received in the first announcement to generate a first network management domain identifier for the first network management domain; and
using, by the at least one processor included in the first I/O module in the first computing system, the first network management domain identifier to join the first network management domain.

17. The method of claim 16, wherein the using the first network management domain identifier to join the first network management domain includes:
determining, by the at least one processor included in the first I/O module in the first computing system, that the first network management domain identifier is associated with the first MCM group identifier in a database.

18. The method of claim 14, further comprising:
performing, by the at least one processor included in the first I/O module in the first computing system, a hashing operation on the second MCM group identifier for the second MCM group received in the second announcement to generate a second network management domain identifier for the second network management domain; and
using, by the at least one processor included in the first I/O module in the first computing system, the second network management domain identifier to join the second network management domain.

19. The method of claim 18, wherein the joining the first network management domain includes:
performing, by the at least one processor included in the first I/O module in the first computing system, a hashing operation on the first MCM group identifier for first MCM group received in the first announcement to generate a first network management domain identifier for the first network management domain;
determining, by the at least one processor included in the first I/O module in the first computing system, that the first network management domain identifier is not associated with the first MCM group identifier in a database; and
performing, by the at least one processor included in the first I/O module in the first computing system, network management domain identifier reservation operations for the first network management domain identifier to join the first network management domain.

20. The method of claim 14, further comprising:
receiving, by the at least one processor included in the first I/O module in the first computing system, a third announcement that was broadcast by the first management module and that includes a third MCM group identifier for a third MCM group;
determining, by the at least one processor included in the first I/O module in the first computing system in response to receiving the third announcement, that the first management module is included in the first computing system with the first I/O module;
leaving, by the at least one processor included in the first I/O module in the first computing system in response to receiving the third MCM group identifier for the third MCM group in the third announcement broadcast by the first management module and determining that the first management module is included the first computing system with the first I/O module, the second network management domain and providing a third network management domain for the third MCM group.

* * * * *